United States Patent
Ji

(10) Patent No.: US 10,112,580 B2
(45) Date of Patent: Oct. 30, 2018

(54) VEHICLE KEY CONTROL APPARATUS, VEHICLE HAVING THE SAME AND VEHICLE KEY CONTROL METHOD

(71) Applicants: HYUNDAI MOTOR COMPANY, Seoul (KR); KIA MOTORS CORPORATION, Seoul (KR)

(72) Inventor: Sang Woo Ji, Yongin-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 15/380,436

(22) Filed: Dec. 15, 2016

(65) Prior Publication Data

US 2018/0022314 A1 Jan. 25, 2018

(30) Foreign Application Priority Data

Jul. 25, 2016 (KR) .................. 10-2016-0094126

(51) Int. Cl.
*G05B 19/00* (2006.01)
*B60R 25/24* (2013.01)

(52) U.S. Cl.
CPC ............ *B60R 25/24* (2013.01); *B60R 25/245* (2013.01); *H05K 999/99* (2013.01)

(58) Field of Classification Search
CPC ...... B60R 25/24; B60R 25/245; H05K 999/99
USPC ....... 340/5.61, 56.62, 5.63, 5.72, 10.51, 8.1, 340/148
See application file for complete search history.

(56) References Cited

U.S. PATENT DOCUMENTS

| | | | |
|---|---|---|---|
| 9,823,335 B2 | 11/2017 | Matsumoto et al. | |
| 2007/0162191 A1* | 7/2007 | Matsubara | G07C 9/00309 701/1 |
| 2008/0204192 A1* | 8/2008 | Hamamura | B60R 25/2072 340/5.72 |
| 2011/0140839 A1* | 6/2011 | DiSalvo | B60R 25/245 340/5.61 |
| 2012/0154114 A1* | 6/2012 | Kawamura | B60R 25/245 340/5.63 |
| 2016/0154086 A1 | 6/2016 | Matsumoto et al. | |

FOREIGN PATENT DOCUMENTS

| | | |
|---|---|---|
| JP | 2008-138463 A | 6/2008 |
| JP | 2010-285742 A | 12/2010 |
| JP | 2014-234667 A | 12/2014 |
| JP | 2015-040406 A | 3/2015 |
| JP | 2015-078537 A | 4/2015 |
| JP | 2015-113643 A | 6/2015 |
| JP | 2016-008486 A | 1/2016 |
| KR | 10-2015-0132503 A | 11/2015 |
| KR | 10-1584068 B1 | 1/2016 |

* cited by examiner

*Primary Examiner* — Dhaval Patel
(74) *Attorney, Agent, or Firm* — McDermott Will & Emery LLP

(57) ABSTRACT

A vehicle key control apparatus includes a communicator receiving a response signal from a vehicle key receiving a search signal transmitted from a vehicle, wherein the response signal comprises an x-axis reception strength, a y-axis reception strength, and a z-axis reception strength; and a controller determining a position of the vehicle key on the basis of at least one among the x-axis reception strength, the y-axis reception strength, and the z-axis reception strength.

13 Claims, 13 Drawing Sheets

VEHICLE KEY CONTROL APPARATUS, VEHICLE HAVING THE SAME AND VEHICLE KEY CONTROL METHOD

CROSS-REFERENCE TO RELATED APPLICATION

This application claims the benefit of priority to Korean Patent Application No. 10-2016-0094126, filed on Jul. 25, 2016 in the Korean Intellectual Property Office, the entire disclosure of which is incorporated herein by reference.

TECHNICAL FIELD

The present disclosure relates to a vehicle key control apparatus which controls a vehicle key, a vehicle including the same, and a vehicle key control method.

BACKGROUND

For drivers' convenience, a vehicle key whereby a door of a vehicle can be opened or closed without inserting the vehicle key into a keyhole of the door, and whereby the vehicle can be started without inserting the vehicle key into a key box inside the vehicle has recently grown in popularity.

Such a vehicle key may be referred to as, e.g., a smart key or a key fob.

An antenna module which recognizes a vehicle key and a vehicle key control apparatus which determines a position of the vehicle key may be provided in a vehicle to open or close the vehicle door or start the vehicle without a driver's additional manipulation.

The precision of detecting the position of the vehicle key may vary according to the number, position, and communication range of antennas included in the antenna module of the vehicle, or the like.

As the number of antennas increases, manufacturing costs of the vehicle increases. Accordingly, there is a need to develop a technique of securing the reliability of detecting the position of the vehicle key while minimizing the number of antennas.

SUMMARY

Therefore, an aspect of the present disclosure provides a vehicle key control apparatus capable of securing the reliability of detecting the position of a vehicle key with a small number of antennas for recognizing the vehicle key, a vehicle including the same, and a vehicle key control method.

Additional aspects of the disclosure will be set forth in part in the description which follows and, in part, will be obvious from the description, or may be learned by practice of the disclosure.

In accordance with one aspect of the present disclosure, a vehicle key control apparatus includes a communicator to receive a response signal from a vehicle key receiving a search signal transmitted from a vehicle, wherein the response signal includes an x-axis reception strength, a y-axis reception strength, and a z-axis reception strength, and a controller to determine a position of the vehicle key on the basis of at least one among the x-axis reception strength, the y-axis reception strength, and the z-axis reception strength.

The controller may store information regarding the position of the vehicle key beforehand by mapping the position to a reference x-axis reception strength, a reference y-axis reception strength, and a reference z-axis reception strength corresponding thereto.

The controller may store information regarding the position of the vehicle key beforehand by mapping the position to a reference sum of the x-axis reception strength, the y-axis reception strength, and the z-axis reception strength corresponding thereto.

The controller may determine the position of the vehicle key by comparing the sum of the x-axis reception strength, the y-axis reception strength, and the z-axis reception strength with the stored reference sum.

When two or more positions are determined as the position of the vehicle key, the controller may compare at least one among the x-axis reception strength, the y-axis reception strength, and the z-axis reception strength with at least one reference value.

The controller may store the information regarding the position of the vehicle key by mapping the position to a reference x-axis reception strength, a reference y-axis reception strength, and a reference z-axis reception strength corresponding thereto. The at least one reference value may include the reference x-axis reception strength, the reference y-axis reception strength, and the reference z-axis reception strength.

In accordance with another aspect of the present disclosure, a vehicle includes an antenna module to transmit a search signal for recognizing a vehicle key, and a vehicle key control apparatus. The vehicle key control apparatus includes a communicator to receive a response signal from the vehicle key receiving the search signal, wherein the response signal includes an x-axis reception strength, a y-axis reception strength, and a z-axis reception strength, and a controller to determine a position of the vehicle key on the basis of at least one among the x-axis reception strength, the y-axis reception strength, and the z-axis reception strength.

The controller may store information regarding the position of the vehicle key beforehand by mapping the position to a reference x-axis reception strength, a reference y-axis reception strength, and a reference z-axis reception strength corresponding thereto.

The controller may store information regarding the position of the vehicle key beforehand by mapping the position to a reference sum of the x-axis reception strength, the y-axis reception strength, and the z-axis reception strength corresponding thereto.

The controller may determine the position of the vehicle key by comparing the sum of the x-axis reception strength, the y-axis reception strength, and the z-axis reception strength with the stored reference sum.

When two or more positions are determined as the position of the vehicle key, the controller may compare at least one among the x-axis reception strength, the y-axis reception strength, and the z-axis reception strength with at least one reference value.

The controller may store the information regarding the position of the vehicle key by mapping the position to a reference x-axis reception strength, a reference y-axis reception strength, and a reference z-axis reception strength corresponding thereto. The at least one reference value may include the reference x-axis reception strength, the reference y-axis reception strength, and the reference z-axis reception strength.

The vehicle may further include the vehicle key including a 3-axis antenna for measuring the x-axis reception strength, the y-axis reception strength, and the z-axis reception strength.

In accordance with another aspect of the present disclosure, a vehicle key control method includes steps of receiving a response signal from a vehicle key receiving a search signal transmitted from a vehicle, wherein the response signal includes an x-axis reception strength, a y-axis reception strength, and a z-axis reception strength, and determining a position of the vehicle key on the basis of at least one among the x-axis reception strength, the y-axis reception strength, and the z-axis reception strength.

The vehicle key control method may further include a step of storing information regarding the position of the vehicle key beforehand by mapping the position to a reference x-axis reception strength, a reference y-axis reception strength, and a reference z-axis reception strength corresponding thereto.

The vehicle key control method may further include a step of storing information regarding the position of the vehicle key beforehand by mapping the position to a reference sum of the x-axis reception strength, the y-axis reception strength, and the z-axis reception strength corresponding thereto.

The step of determining the position of the vehicle key may include determining the position of the vehicle key by comparing the sum of the x-axis reception strength, the y-axis reception strength, and the z-axis reception strength with the stored reference sum.

When two or more positions are determined as the position of the vehicle key, the step of determining the position of the vehicle key may further include comparing at least one among the x-axis reception strength, the y-axis reception strength, and the z-axis reception strength with at least one reference value.

The vehicle key control method may further include a step of storing the information regarding the position of the vehicle key by mapping the position to a reference x-axis reception strength, a reference y-axis reception strength, and a reference z-axis reception strength corresponding thereto. The at least one reference value may include the reference x-axis reception strength, the reference y-axis reception strength, and the reference z-axis reception strength.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Figure 1:
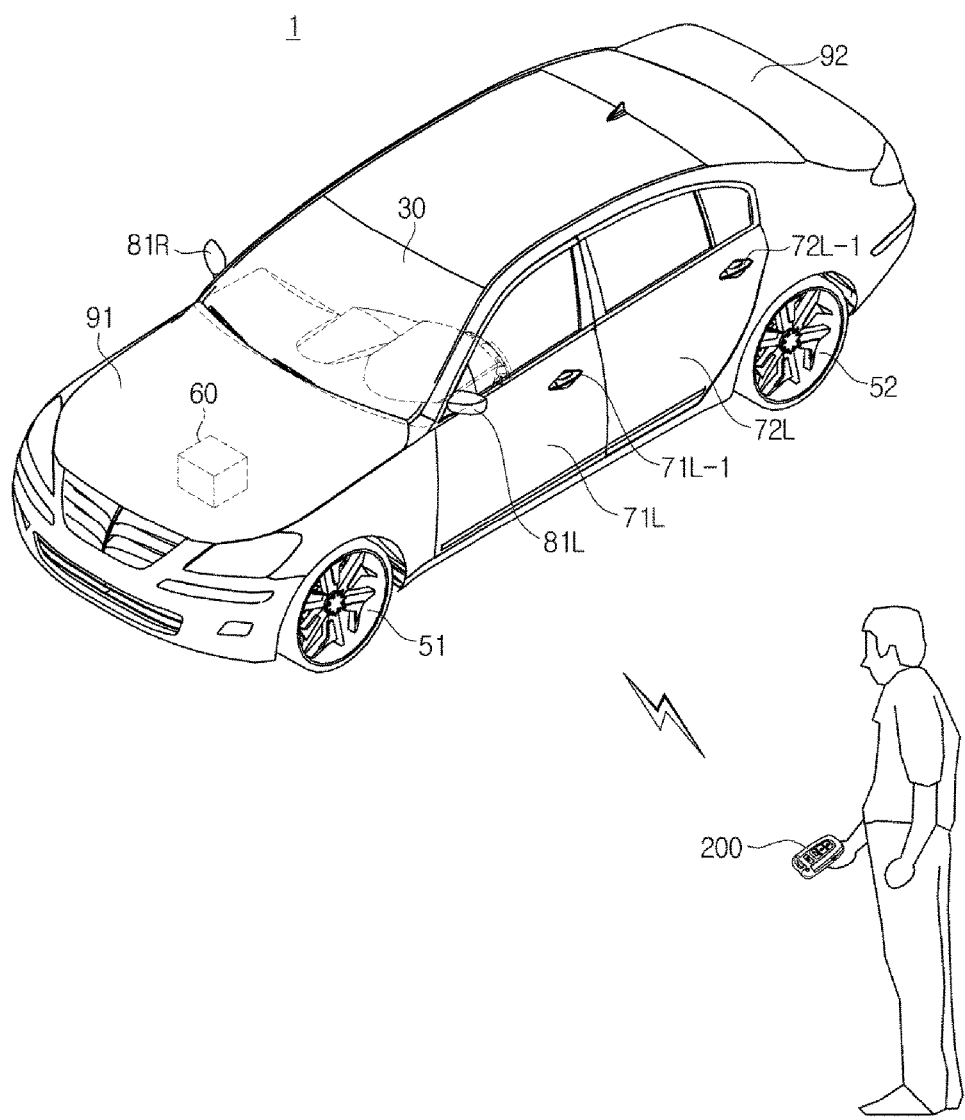
FIG. 1 is a diagram illustrating the exterior of a vehicle in accordance with one exemplary embodiment of the present disclosure.

Reference will now be made in detail to exemplary embodiments of the present disclosure, examples of which are illustrated in the accompanying drawings, wherein like reference numerals refer to like elements throughout.

Hereinafter, a vehicle key control apparatus, a vehicle including the same, and a vehicle key control method in accordance with embodiments of the present disclosure will be described in detail with reference to the accompanying drawings.

Figure 2:
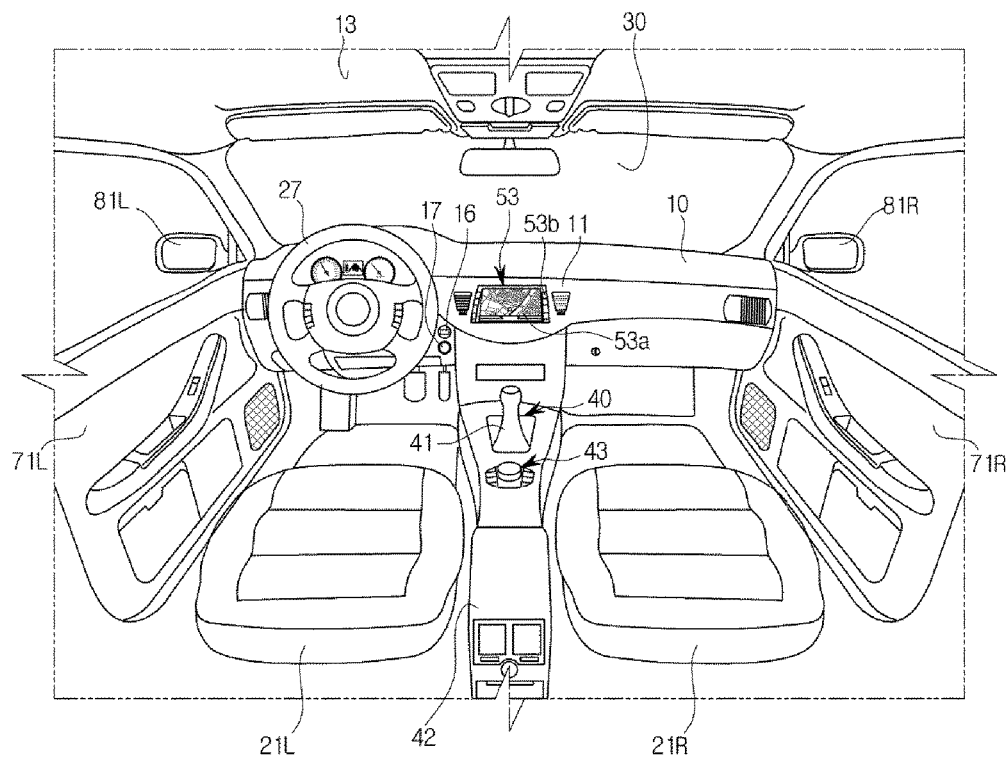
FIGS. 2 and 3 are diagrams illustrating an inner structure of a vehicle in accordance with one exemplary embodiment of the present disclosure.
Figure 3:
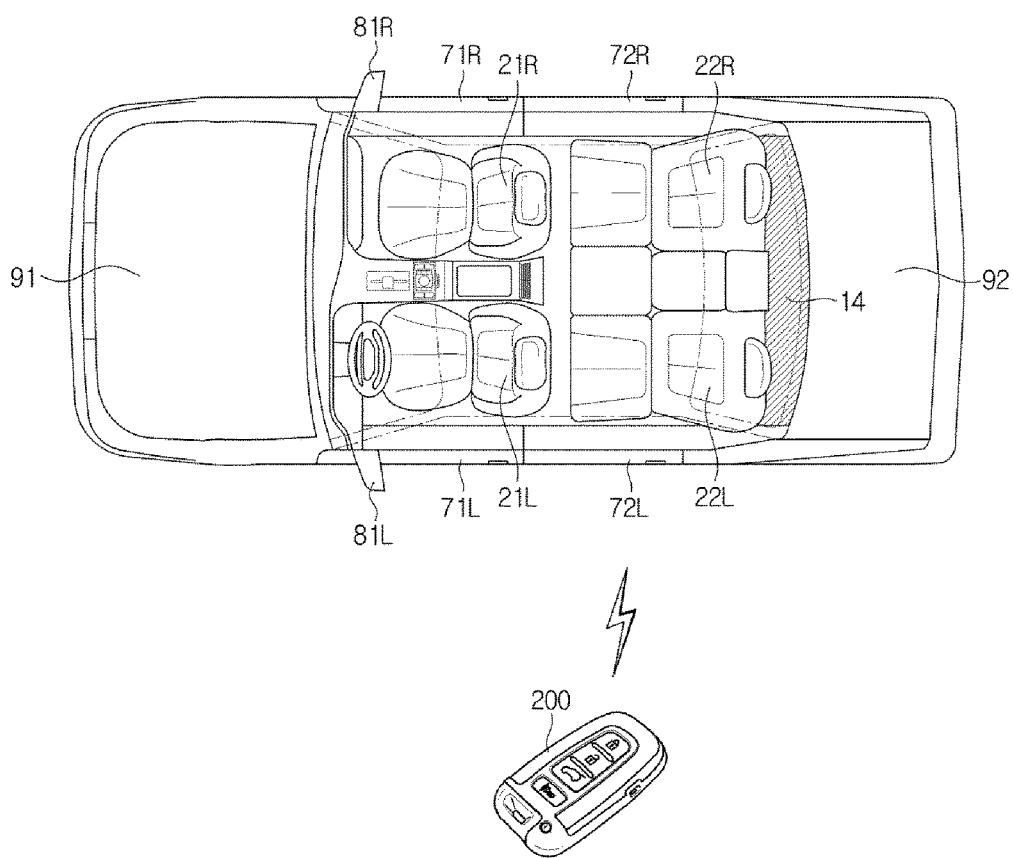

FIG. 1 is a diagram illustrating the exterior of a vehicle in accordance with one exemplary embodiment of the present disclosure. FIGS. 2 and 3 are diagrams illustrating an inner structure of the vehicle in accordance with one exemplary embodiment of the present disclosure.

A vehicle refers to a mode of transportation that may drive on the road and examples thereof may include four-wheel-drive cars, two-wheel-drive cars, three-wheel-drive cars, movable construction equipment, etc. A type of a vehicle in accordance with an embodiment of the present disclosure is not limited but a four-wheel-drive car will be described as an example in the following embodiments for convenience of explanation.

Referring to FIGS. 1 to 3, a vehicle 1 in accordance with an exemplary embodiment of the present disclosure includes wheels 51 and 52 for moving the vehicle 1, doors 71L, 71R, 72L, and 72R which shield the inside of the vehicle 1 from the outside, a front glass 30 through which a driver in the vehicle 1 may view a sight in front of the vehicle 1, and side-view mirrors 81L and 81R through which the driver may view a sight behind the vehicle 1.

The wheels 51 and 52 include the front wheel 51 at the front of the vehicle 1 and the rear wheel 52 at the back of the vehicle 1. A driving unit 60 inside the vehicle 1 provides turning force to the front wheel 51 or the rear wheel 52 so as to move the vehicle 1.

The turning force is applied to the front wheel 51 when the vehicle 1 is a front-wheel-drive vehicle, and is applied to the rear wheel 52 when the vehicle 1 is a rear-wheel drive vehicle. When the vehicle 1 is a four-wheel-drive vehicle, the turning force may be applied to both of the front wheel 51 and the rear wheel 52.

The driving unit 60 may employ either an engine which burns fossil fuel to generate the turning force or a motor which receives power from an electric condenser and generates the turning force or may include both of the engine and the motor and employ a hybrid method of selectively using the engine and the motor.

The doors 71L, 71R, 72L, and 72R are provided at left and right sides of the vehicle 1 to be rotationally moved, whereby a driver or a passenger may get in the vehicle 1 when they are opened and the inside of the vehicle 1 may be shielded from the outside when they are closed. In the following embodiments, a driver and a passenger will be referred together as a user.

Handles 71L-1, 71R-1, 72L-1, and 72R-1 may be respectively provided at the doors 71L, 71R, 72L, and 72R so that a user may open or close the doors 71L, 71R, 72L, and 72R by gripping the handles 71L-1, 71R-1, 72L-1, and 72R-1. In the related art, a door of a vehicle is unlocked by inserting a vehicle key into a key seat near a handle. In contrast, in the vehicle 1 in accordance with an embodiment of the present disclosure, the doors 71L, 71R, 72L, and 72R may be unlocked without inserting a vehicle key 200 into a key seat when authentication between the vehicle 1 and the vehicle key 200 which the user carries with him/herself is completed by establishing wireless communication between the vehicle 1 and the vehicle key 200. The authentication between the vehicle 1 and the vehicle key 200 and operations to be performed after the authentication is completed will be described in detail below.

The front glass 30 is provided at a front and upper side of the vehicle 1, whereby a driver in the vehicle 1 may obtain visual information in front of the vehicle 1, and may be also referred to as a windshield glass.

The side-view mirrors 81L and 81R include the left side-view mirror 81L at a left side of the vehicle 1 and the right side-view mirror 81R at a right side of the vehicle 1, whereby a driver in the vehicle 1 may obtain visual information at lateral and rear sides of the vehicle 1.

In addition, although not shown, the vehicle 1 may include sensor devices, such as a proximity sensor which senses either an obstacle at a rear or lateral side of the vehicle 1 or other vehicles, a rain sensor which senses precipitation and a precipitation rate, etc.

Referring to FIG. 2, a navigation console 53 may be provided in a center fascia 11 which is a central region of a dashboard 10. The navigation console 53 may perform an audio function or a video function, and may perform a navigation function in an integrated manner. In this case, the navigation console 53 may be referred to as an audio/video navigation (AVN) device.

The navigation console 53 may include a display 53a which displays a screen needed to perform the audio function, the video function, or the navigation function, and an input 53b through which a user's command is received.

The display 53a may be embodied as one of various display devices, such as a liquid crystal display (LCD), a light-emitting diode (LED), a plasma display panel (PDP), an organic light-emitting diode (OLED), a cathode ray tube (CRT), etc.

The input 53b may be provided in the form of a hard key type in a region near the display 53a. When the display 53a is embodied as a touch screen type, the display 53a may also perform functions of the input 53b.

A jog shuttle type or hard key type center input 43 may be provided on a center console 40. The center console 40 means a portion located between a driver seat 21L and a passenger seat 22R, at which a gear manipulation lever 41 and a center tray 42 are formed. The center input 43 may perform some or all of the functions of the input 53b of the navigation console 53.

A steering wheel 27 is provided on the dashboard 10 near the driver seat 21L. A key seat 16 may be formed in a region adjacent to the steering wheel 27, into which the vehicle key 200 may be inserted. When the vehicle key 200 is inserted into the key seat 16, a communication terminal within the key seat 16 and a communication terminal within the vehicle key 200 are in contact with each other and thus the vehicle 1 may be switched to a state in which various functions may be performed.

Furthermore, a start button 17 configured to turn on or off the vehicle 1 may be provided on the dashboard 10. If the vehicle key 200 is inserted into the key seat 16 or if authentication between the vehicle key 200 and the vehicle 1 is successfully performed via a wireless communication network, the vehicle 1 may be 'on' when the user pressurizes the start button 17.

A range of available functions may vary according to the position of the vehicle key 200. As illustrated in FIG. 3, a function related to opening/closing of the vehicle 1 may be allowed when the vehicle key 200 is outside the vehicle 1 and a function of turning on or off the vehicle 1 may be allowed when the vehicle key 200 is inside the vehicle 1.

Even if the vehicle key 200 is outside the vehicle 1, a case in which the vehicle key 200 is located near the doors 71R, 71L, 72R, and 72L and a case in which the vehicle key 200 is located near a trunk 92 may be differently handled.

The vehicle key 200 may be placed on various locations inside the vehicle 1, e.g., the driver seat 21L, the passenger seat 21R, back seats 22L and 22R, the dashboard 10, the center tray 42, and a rear tray 14 between the back seats 22L and 22R and the trunk 92, and the like.

Figure 4:
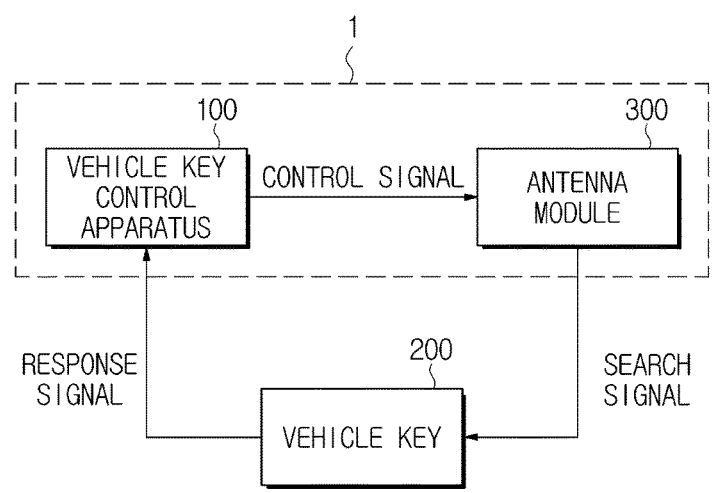
FIG. 4 is a control block diagram of a vehicle key control apparatus and a vehicle including the same in accordance with one exemplary embodiment of the present disclosure.

FIG. 4 is a control block diagram of a vehicle key control apparatus and a vehicle including the same in accordance with one embodiment of the present disclosure.

Referring to FIG. 4, a vehicle 1 includes an antenna module 300 configured to be used to recognize a vehicle key 200, and a vehicle key control apparatus 100 configured to control the antenna module 300, authenticate the vehicle key 200, and determine the position of the vehicle key 200.

The antenna module 300 may include a plurality of antennas via which a low-frequency (LF) signal or an ultra-high-frequency (UHF) signal is transmitted.

For example, the LF signal may be a radio signal having a low frequency band ranging from 120 kHz to 135 kHz, and the UHF signal may be a radio signal ranging from 315 MHz to 433 MHz.

The antenna module 300 may transmit a search signal for detecting the vehicle key 200 in the LF signal or the UHF signal. The vehicle key 200 receiving the search signal may transmit a response signal to the search signal to the vehicle key control apparatus 100. The response signal which the vehicle key 200 transmits may be a radio-frequency (RF) signal.

The vehicle key control apparatus 100 may authenticate the vehicle key 200 and determine the position of the vehicle key 200 on the basis of the response signal received from the vehicle key 200.

Although FIG. 4 illustrates that the vehicle key 200 is not included in the vehicle 1, the vehicle key 200 may be configured as an element of the vehicle 1 which may be wirelessly connected to the vehicle 1.

In the related art, five, six, or more antennas are used to determine the position of the vehicle key 200. In contrast, the vehicle 1 in accordance with one embodiment of the present disclosure may secure the reliability of detecting the position of the vehicle key 200 even when only four or less antennas are used, as will be described in the following embodiments in detail.

Figure 5:
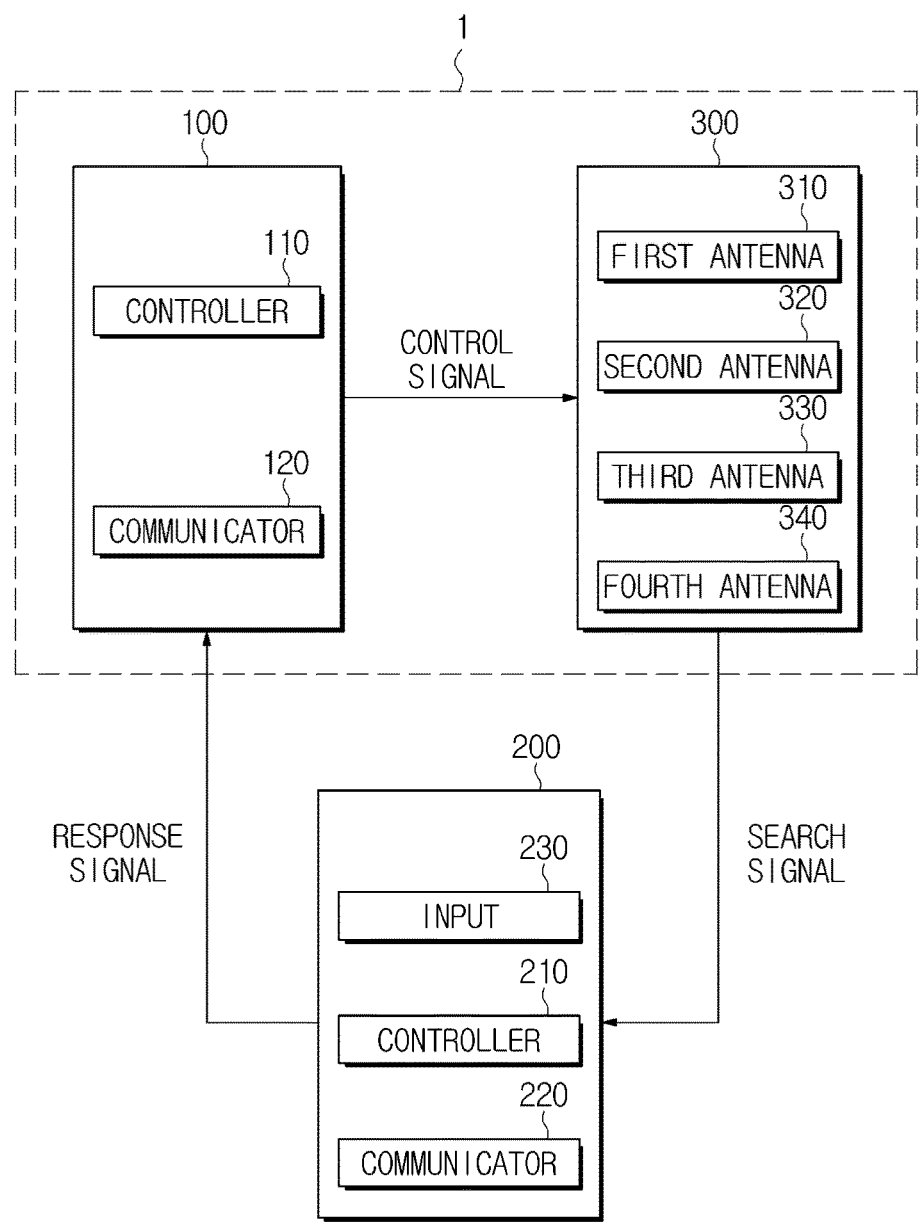
FIG. 5 is a control block diagram of elements of a vehicle key control apparatus and a vehicle in accordance with one exemplary embodiment of the present disclosure.
Figure 6:
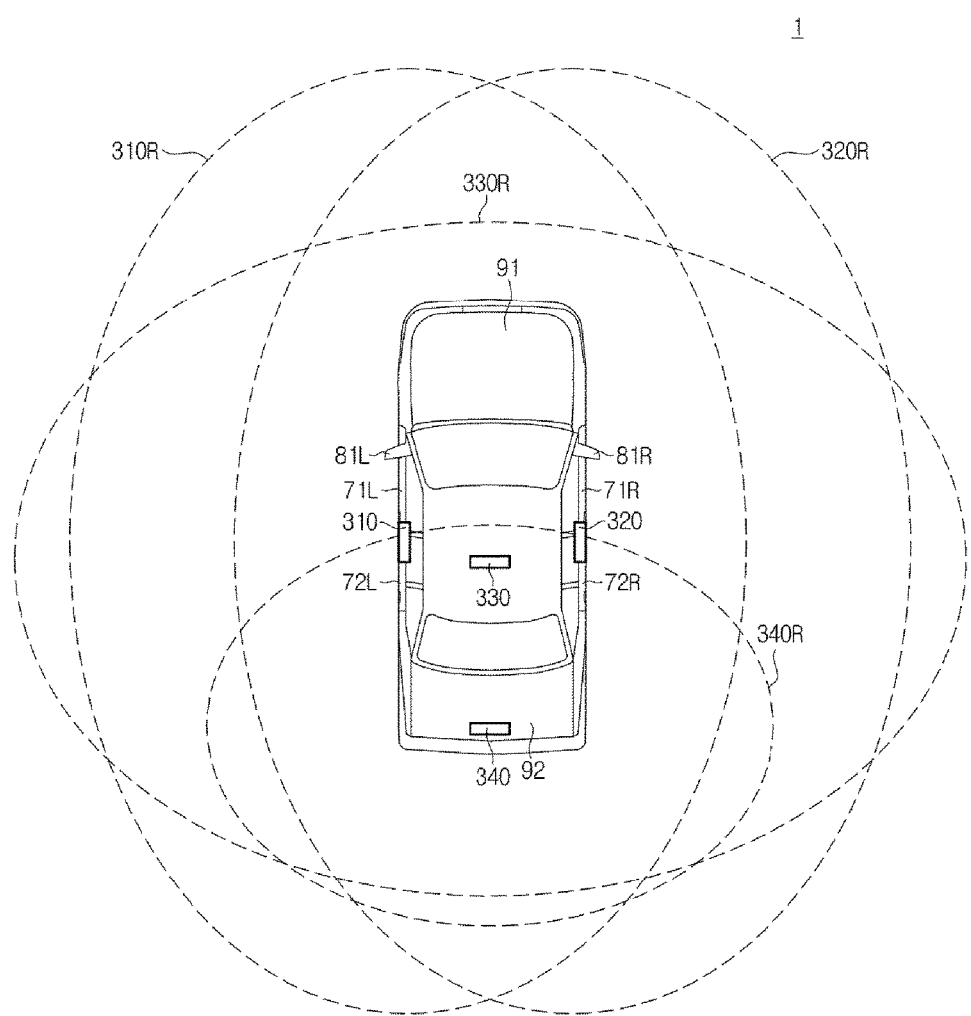
FIG. 6 is a diagram illustrating a range of communication of each of antennas included in an antenna module.
Figure 7:
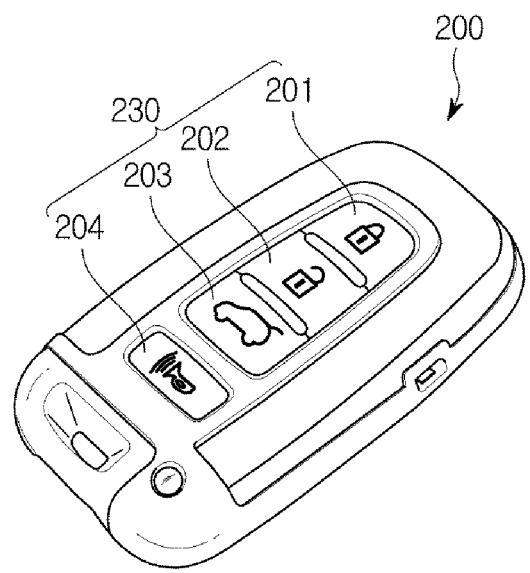
FIG. 7 is a diagram illustrating the exterior of a vehicle key.

FIG. 5 is a control block diagram of elements of a vehicle key control apparatus and a vehicle in accordance with one embodiment of the present disclosure. FIG. 6 is a diagram illustrating a range of communication of each of antennas included in an antenna module. FIG. 7 is a diagram illustrating the exterior of a vehicle key.

Referring to FIG. 5, the vehicle key control apparatus 100 may include a communicator 120 which transmits a control signal to the vehicle key 200 and receives a response signal from the antenna module 300, and a controller 110 which authenticates the vehicle key 200 and determines the position of the vehicle key 200.

That is, when the antenna module 300 transmits a search signal and the vehicle key 200 receiving the search signal transmits a response signal to the search signal to the vehicle key control apparatus 100, the communicator 120 may receive the response signal, and the controller 110 may authenticate between the vehicle 1 and the vehicle key 200 and release various electronic components of the vehicle 1 so that an authenticated user may use the various electronic components when the authentication is completed.

For example, when the authentication is completed, the controller 110 may unlock the steering wheel 27 or the start button 17, unlock the trunk 92, or unlock the doors 71R, 71L, 72R, and 72L.

However, a range of unlocking may vary according to the position of the vehicle key 200 as described above. Thus, the controller 110 determines the position of the vehicle key 200 before unlocking the steering wheel 27, the start button 17, the doors 71R, 71L, 72R, and 72L, or the trunk 92. A process of determining the position of the vehicle key 200, performed by the controller 110, will be described in detail below.

The controller 110 may include a memory which stores a program performing the functions described above and functions which will be described below and data needed to run this program, and a processor which runs the program stored in the memory. The controller 110 may be embodied as an electrical controller (ECU).

Among the operations of the controller 110, the unlocking of the various electronic components except the controlling of the antenna module 300, the authenticating of the vehicle key 200, and the determining of the position of the vehicle key 200 may be performed by an additional controller provided in the vehicle 1 rather than the controller 110 of the vehicle key control apparatus 100.

For example, the vehicle 1 may additionally include a steering locking controller which controls locking/unlocking of the steering wheel 27, a start controller which controls turning on/off the vehicle 1, a trunk controller which controls locking/unlocking of the trunk 92, etc. The vehicle 1 may further include various controllers for controlling locking/unlocking of the electronic components of the vehicle 1 according to whether the vehicle key 200 is authenticated and the position of the vehicle key 200.

Referring to FIGS. 5 and 6, the antenna module 300 may include a first antenna 310, a second antenna 320, a third antenna 330, and a fourth antenna 340.

For example, the first antenna 310 may be provided at the handle 71L-1 of the driver seat door 71L, and the second antenna 320 may be provided at the handle 71R-1 of the passenger seat door 71R.

As another example, the first antenna 310 and the second antenna 320 may be respectively provided at the handle 72L-1 of the left back seat door 72L and the handle 72R-1 of the right back seat door 72R.

As another example, the first antenna 310 and the second antenna 320 may be provided at regions other than the handles 71L-1, 71R-1, 72L-1, and 72R-1 of the doors 71L, 71R, 72L, and 72R.

The third antenna 330 and the fourth antenna 340 may be provided inside the vehicle 1. The third antenna 330 may be provided in spaces opened/closed by the doors 71L, 71R, 72L, and 72R. The fourth antenna 340 may be provided at the trunk 92.

In the vehicle 1 in accordance with an embodiment of the present disclosure, locations at which the first to fourth antennas 310 to 340 are provided are not limited and thus the first to fourth antennas 310 to 340 may be provided at appropriate locations in consideration of a range of communication of each of the first to fourth antennas 310 to 340.

In the related art, four or more antennas are installed in the vehicle 1 to sense the position of the vehicle key 200. In contrast, even when only the two antennas 330 and 340 are installed in the vehicle 1 in accordance with an embodiment of the present disclosure, the reliability of determining the position of the vehicle key 200 may be secured and manufacturing costs may be deceased due to a reduction in the number of antennas.

The first to fourth antennas 310 to 340 may transmit search signals for recognizing the vehicle key 200, and the search signals may reach available communication regions of the respective antennas 310 to 340.

When the vehicle key 200 is positioned in a first region 310R which is the available communication region of the first antenna 310, the search signal transmitted from the first antenna 310 may be received. When the vehicle key 200 is positioned in a second region 320R which is the available communication region of the second antenna 320, the search signal transmitted from the second antenna 320 may be received.

When the vehicle key 200 is positioned in a third region 330R which is the available communication region of the third antenna 330, the search signal transmitted from the third antenna 330 may be received. When the vehicle key 200 is positioned in a fourth region 340R which is the available communication region of the fourth antenna 340, the search signal transmitted from the fourth antenna 340 may be received.

When the vehicle key 200 is positioned in a location where two or more available communication regions overlap, all of two or more search signals may be received.

A range of an available communication region of an antenna may vary according to an output current and a frequency band. As the intensity of the output current increases and the frequency band becomes higher, the range of the available communication region increases. The antennas 310 to 340 may have the same output current and the same frequency band but may have different output currents and different frequency bands.

The vehicle key 200 may include a communicator 220 which receives a search signal transmitted from the antenna module 300 and transmits a response signal to the search signal to the vehicle key control apparatus 100, a controller 210 which controls overall operations of the vehicle key 200, and an input 230 via which a control command is received from a user.

Although not shown, the vehicle key 200 may further include a power supply which supplies power, and a sensor unit which senses movement of the vehicle key 200, such as an accelerator sensor, a vibration sensor, or a gyro sensor.

When the search signal transmitted from the antenna module 300 is an LF signal, the communicator 220 may include an LF antenna to receive the search signal. The LF antenna may be a 3-axis antenna capable of measuring the intensities of signals with respect to an x-axis, a y-axis, and a z-axis in a three-dimensional (3D) space.

When the response signal transmitted from the vehicle key 200 to the vehicle key control apparatus 100 is an RF signal, the communicator 220 may include an RF antenna to transmit the response signal.

For example, the vehicle key 200 may be embodied in the form of a key fob as illustrated in FIG. 7. Referring to FIG. 7, the input 230 may include a lock button 201 which locks a door of the vehicle 1, an unlock button 202 which unlocks the door of the vehicle 1, a trunk unlock button 203 which unlocks the trunk 92, and a horn button 204 which blows a horn of the vehicle 1.

FIG. 7 illustrates a case in which the vehicle key 200 is embodied as a key fob but the vehicle key 200 may not be the key fob, provided that the vehicle key 200 may perform operations thereof according to the present embodiment.

For example, the vehicle key 200 may be embodied as a mobile device such as a smart phone or a wearable device such as a smart watch or smart glasses. In this case, an application which performs the operations of the vehicle key 200 may be installed in the mobile device or the wearable device. The application may have been installed in the mobile device or the wearable device before purchase thereof or may be downloaded to the mobile device or the wearable device from a server after purchase thereof.

Operations of a vehicle key and a vehicle according to relative positions thereof will be described in detail with reference to FIGS. 8 and 9 below.

Figure 8:
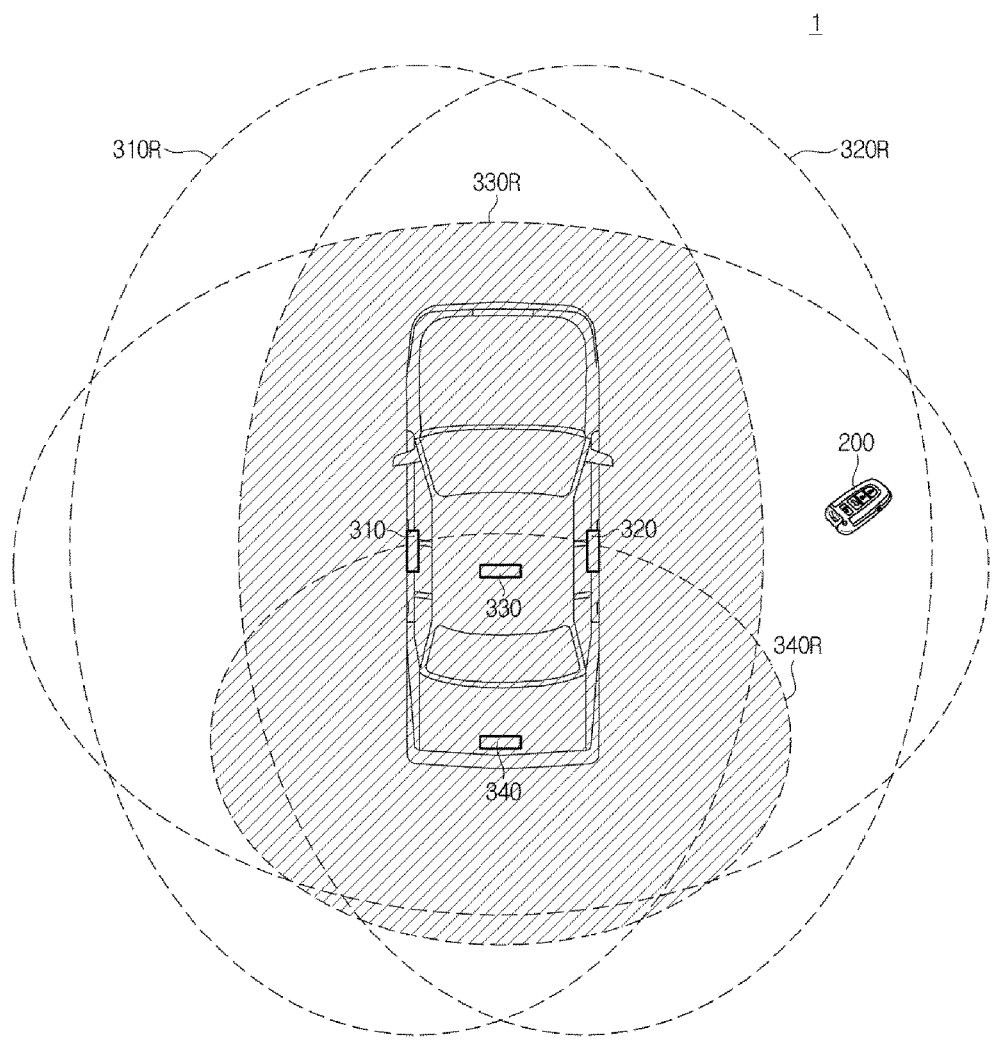
FIG. 8 is a diagram illustrating a case in which a vehicle key is positioned in a normal antenna-module sensing region in a normal mode of a vehicle.

FIG. 8 is a diagram illustrating a case in which a vehicle key is positioned in a normal antenna-module sensing region in a normal mode of a vehicle. FIG. 9 is a diagram illustrating a case in which the vehicle key is positioned in an antenna-module position sensing region in a standby mode of the vehicle.

All the first to fourth antennas 310 to 340 of the antenna module 300 may continuously output search signals for recognizing the vehicle key 200. However, in order to reduce power consumption, the first antenna 310 and the second antenna 320 outside the vehicle 1 may continuously output search signals and the third antenna 330 and the fourth antenna 340 may output search signals after the vehicle key 200 is sensed through the first antenna 310 and the second antenna 320. The latter case will be described as an example below.

As illustrated in FIG. 8, when the vehicle key 200 is positioned in the first region 310R or the second region 320R in a normal mode in which only the first antenna 310 and the second antenna 320 output search signals, the communicator 220 of the vehicle key 200 receives the search signal transmitted from the first antenna 310 or the second antenna 320.

The search signal may contain identification (ID) information of the vehicle 1. The controller 210 of the vehicle key 200 may perform authentication by comparing the ID information contained in the search signal with ID information of the vehicle key 200, and transmit a response signal to the vehicle key control apparatus 100 via the communicator 220 when the ID information contained in the search signal matches the ID information of the vehicle key 200. The response signal may be transmitted in an RF signal.

Alternatively, the controller 110 of the vehicle key control apparatus 100 may authenticate the vehicle key 200. In this case, the controller 110 may compare ID information contained in a response signal from the vehicle key 200 with ID information of the vehicle 1, and authenticate the vehicle key 200 and perform a series of operations based on the position of the vehicle key 200 when the ID information contained in the response signal matches the ID information of the vehicle 1.

The controller 210 of the vehicle key 200 may measure reception strength of a search signal received by the communicator 220. For example, the reception strength may be measured in the form of a received signal strength indicator (RSSI). The vehicle key 200 transmits, in the response signal, information regarding the reception strength of the search signal.

The reception strength of the search signal received by the vehicle key 200 may vary according to the position of the vehicle key 200. Thus, the controller 110 of the vehicle key control apparatus 100 determines the position of the vehicle key 200 on the basis of the information regarding the reception strength contained in the response signal. For example, a database may be built up beforehand by mapping reception strengths and positions of the vehicle key 200 corresponding thereto, and stored in a memory.

For example, in the normal mode, when the position of the vehicle key 200 corresponding to information regarding a reception strength received from the vehicle key 200 is a standby-mode position, the controller 110 may transmit a control signal to the other antennas 330 and 340 of the antenna module 300 as well as the first and second antennas 310 and 320, so that the other antennas 330 and 340 may transmit search signals. That is, when the distance between the vehicle key 200 and the vehicle 1 is a reference distance or less, the vehicle key 200 may be determined to be at a standby-mode position and thus the vehicle key control apparatus 100 may switch the vehicle 1 from the normal mode to the standby mode in which a user is waited to get in the vehicle 1.

When the vehicle 1 is switched to the standby mode, an operation of providing convenience to a user who will get in the vehicle 1, e.g., unfolding the side-view mirrors 81R and 81L which are folded, turning on lights provided at the handles 71L-1, 71R-1, 72L-1, and 72R-1, etc., may be performed. Such an operation may be referred to as a welcome function.

When the vehicle 1 is switched to the standby mode and search signals are transmitted from all the first antenna 310, the second antenna 320, the third antenna 330, and the fourth antenna 340, the vehicle key 200 receives the search signals and measures the reception strengths thereof. In the standby mode, the number of antennas transmitting search signals is greater than in the normal mode and thus the position of the vehicle key 200 may be more precisely determined.

Figure 9:
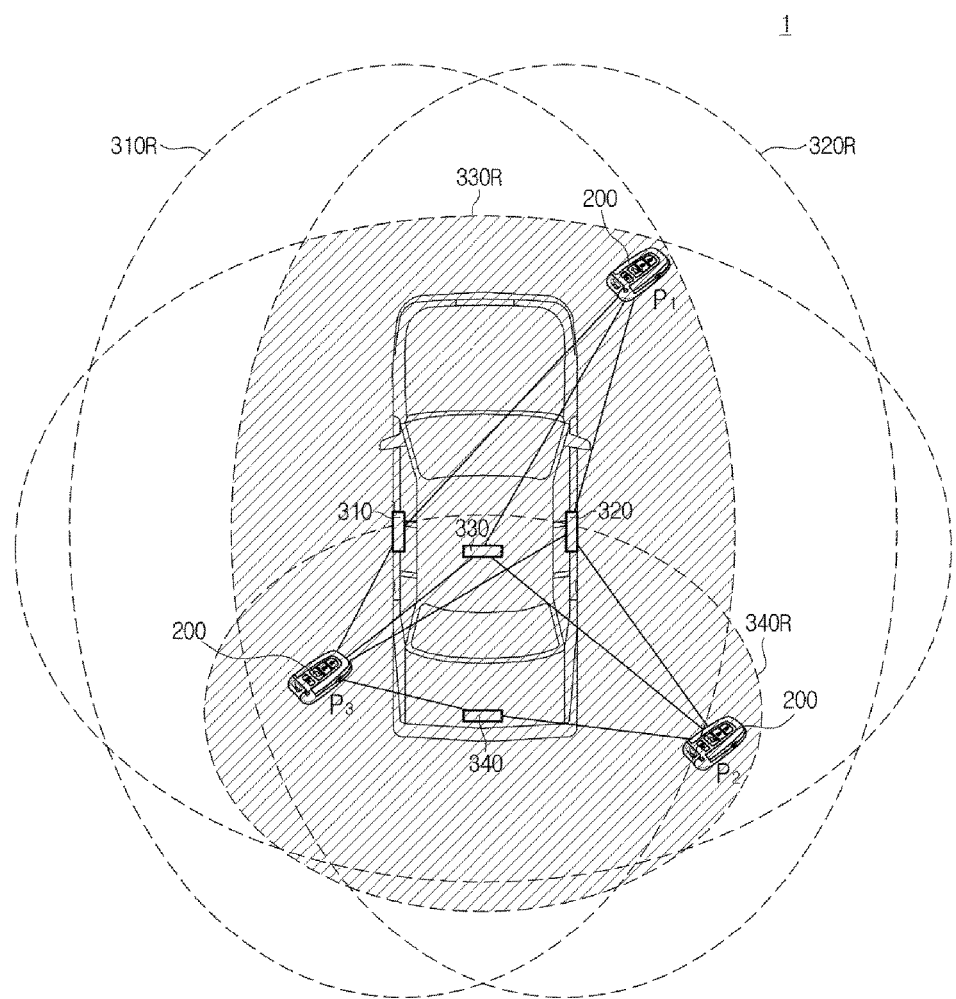
FIG. 9 is a diagram illustrating a case in which a vehicle key is positioned in an antenna-module position sensing region in a standby mode of a vehicle.

As illustrated in FIG. 9, when the vehicle key 200 is positioned at a position P1 at which the first region 310R, the second region 320R, and the third region 330R overlap one another, all the search signals transmitted from the first antenna 310, the second antenna 320, and the third antenna 330 may be received.

When the vehicle key 200 is positioned at a position P2 at which the second region 320R, the third region 330R, and the fourth region 340R overlap one another, all the search signals transmitted from the second antenna 320, the third antenna 330, and the fourth antenna 340 may be received.

When the vehicle key 200 is positioned at a position P3 at which the first region 310R, the second region 320R, the third region 330R, and the fourth region 340R overlap one another, all the search signals transmitted form the first antenna 310, the second antenna 320, the third antenna 330, and the fourth antenna 340 may be received.

All the three positions P1, P2, and P3 illustrated in FIG. 9 are included in a position sensing region in which the position of the vehicle key 200 may be sensed.

A type of operation to be performed may vary according to the position of the vehicle key 200. For example, when it is determined that the vehicle key 200 is positioned near the doors 71L, 71R, 72L, and 72R outside the vehicle 1, the controller 110 may control a door open function to be performed so that a user may open the doors 71L, 71R, 72L, and 72R by manipulating buttons on the doors 71L, 71R, 72L, and 72R.

When it is determined that the vehicle key 200 is positioned near the trunk 92 outside the vehicle 1, the controller 110 may control a trunk open function to be performed so that a user may open the door of the trunk 92 by manipulating a button on the trunk 92.

When it is determined that the vehicle key 200 is positioned inside the vehicle 1, the controller 110 may control a turn-on function to be performed so that a user may turn on the vehicle 1 by manipulating the start button 17.

When it is determined that the vehicle key 200 is positioned in the trunk 92 inside the vehicle 1 and the trunk 92 is closed, the controller 110 may control a trunk close warning function to be performed so that a user may notice that the vehicle key 200 is positioned in the trunk 92. The trunk close warning function may be performed using at least one of an audio method and a video method.

The above operations are, however, merely examples of operations to be performed according to the position of the vehicle key 200, and embodiments of the present disclosure are not limited thereto. Thus, operations other than the above operations may be further performed.

Figure 10:
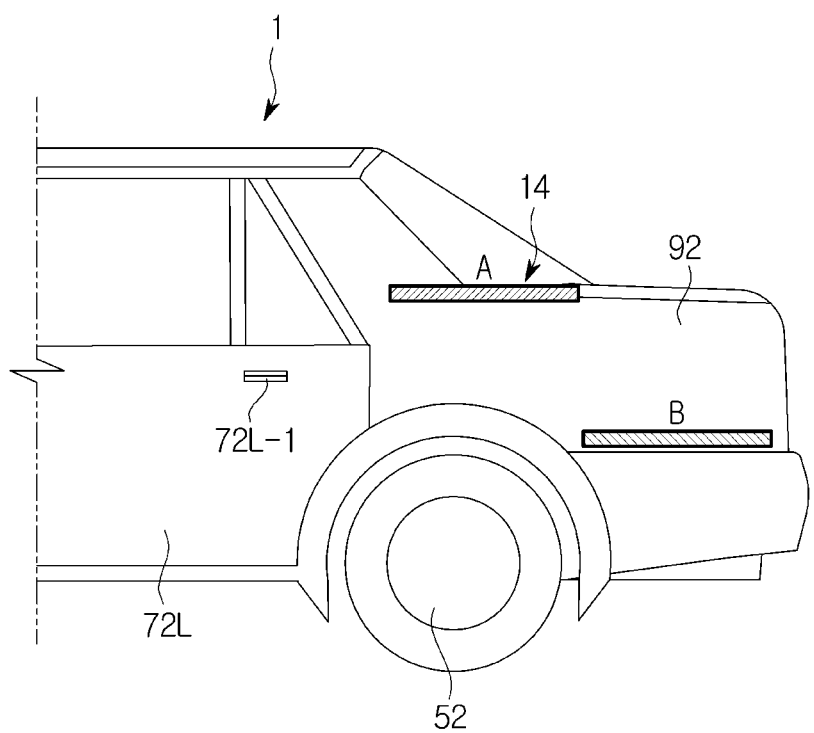
FIG. 10 is a diagram illustrating a rear-tray region and a trunk region inside a vehicle.
Figure 11:
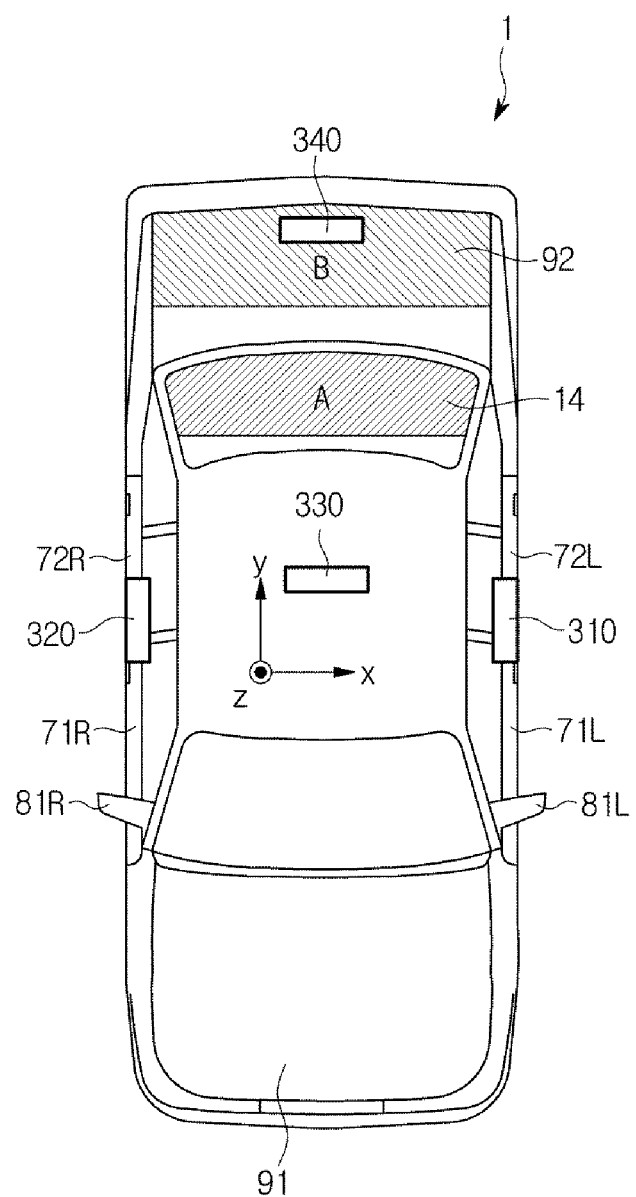
FIGS. 11 and 12 are diagrams illustrating whether a rear-tray region and a trunk region inside a vehicle are distinguished from each other in a three-dimensional (3D) space.
Figure 12:
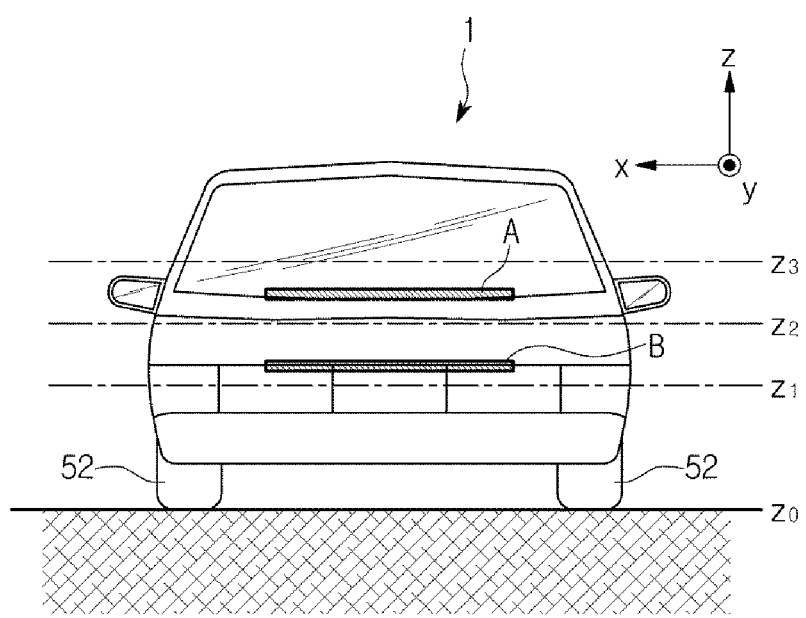

FIG. 10 is a diagram illustrating a rear-tray region and a trunk region inside a vehicle. FIGS. 11 and 12 are diagrams illustrating whether a rear-tray region and a trunk region inside a vehicle are distinguished from each other in a 3D space.

Even if locations are spatially adjacent to each other, operations or functions corresponding thereto may be different. For example, as illustrated in FIG. 10, although both a rear-tray region A and a trunk region B are within the vehicle 1, the controller 110 performs the turn-on function when the vehicle key 200 is in the rear-tray region A, and performs the trunk close warning function when the vehicle key 200 is in the trunk region B.

Thus, the rear-tray region A and the trunk region B should be exactly differentiated from each other but they are not remarkably different in position. In particular, it is difficult to differentiate the rear-tray region A and the trunk region B from each other when the difference between the positions thereof is in an allowable range of error for a result of determining the position of the vehicle key 200.

Thus, the controller 110 may individually use output values of the 3-axis antenna of the communicator 220 in determining the position of the vehicle key 200, thereby improving the reliability of determining the position of the vehicle key 200. To this end, the vehicle key 200 may transmit, in a response signal, information regarding a reception strength on the x-axis (an x-axis reception strength), a reception strength on the y-axis (a y-axis reception strength), and a reception strength on the z-axis (a z-axis reception strength) of the 3-axis antenna.

Even if it is difficult to differentiate locations from each other using the sum of the x-axis reception strength, the y-axis reception strength, and the z-axis reception strength, locations which are different in at least one among the 3-axis reception strengths may be differentiated from each other by comparing the 3-axis reception strengths thereof with one another.

To this end, the controller 110 may store information regarding the position of the vehicle key 200 beforehand by mapping the position to a reference x-axis reception strength, a reference y-axis reception strength, and a reference z-axis reception strength corresponding thereto.

Alternatively, the information regarding the position of the vehicle key 200 may be stored beforehand by mapping the position to a reference sum of the x-axis reception strength, the y-axis reception strength, and the z-axis reception strength corresponding thereto.

The controller 110 may determine the position of the vehicle key 200 by comparing the sum $P_{sum}$ of the x-axis reception strength, the y-axis reception strength received from the vehicle key 200, and the z-axis reception strength with the stored reference sum.

When two or more positions are determined as the position of the vehicle key 200, the controller 110 may compare at least one among the x-axis reception strength, the y-axis reception strength, and the z-axis reception strength with at least one reference value. Here, the at least one reference value includes the reference x-axis reception strength, the reference y-axis reception strength, and the reference z-axis reception strength.

The rear-tray region A and the trunk region B will be described as an example in detail below.

As illustrated in FIG. 11, the positions of the rear-tray region A and the trunk region B on the x-axis are difficult to be differentiated from each other, and the positions of the rear-tray region A and the trunk region B on the y-axis are not remarkably different from each other. In particular, when the difference between the positions thereof on the y-axis is in an allowable range of error as described above, it may be difficult to differentiate the rear-tray region A and the trunk region B from each other using only the x-axis reception strength and the y-axis reception strength.

In contrast, as illustrated in FIG. 12, when the difference between the positions of the rear-tray region A and the trunk region B on the z-axis exceeds an allowable range of error $(z_3-z_2)$ or $(z_2-z_1)$, they may be differentiated from each other using the z-axis reception strength.

To this end, when a database of positions matching reception strengths is built up and stored, the controller 110 may divide the reception strengths into x-axis reception strengths, y-axis reception strengths, and z-axis reception strengths, and store them. The database may be built up, for example, by conducting a simulation, an experiment, or tuning using the vehicle 1 and the vehicle key 200.

Furthermore, reception strengths for all positions may be divided into x-axis reception strengths, y-axis reception strengths, and z-axis reception strengths, and are then stored. Basically, a database may be built up by matching a reference sum of the 3-axis reception strengths and a location corresponding thereto. When two or more positions correspond to the reference sum, only reception strengths for the two or more positions may be divided into x-axis reception strengths $P_x$, y-axis reception strengths $P_y$, and z-axis reception strengths $P_z$, and be then stored.

For example, the sum $P_{sum}$ of 3-axis reception strengths may be defined by Equation 1 below. However, the definition of the sum $P_{sum}$ using Equation 1 below is merely an example, and various methods may be used to define the sum $P_{sum}$, provided that the sum $P_{sum}$ calculated therethrough can reflect all the 3-axis reception strengths.

$$P_{sum}=P_x^2+P_y^2+P_z^2 \quad \text{[Equation 1]}$$

As a concrete example, when the sum $P_{sum}$ of the 3-axis reception strengths is in a range of 32000 to 54000, two positions corresponding thereto may correspond to the rear-tray region A and the trunk region B. In this case, the controller 110 may compare each of the x-axis reception strength $P_x$, the y-axis reception strength $P_y$, and the z-axis reception strength $P_z$ with a reference value or a reference range so as to differentiate the rear-tray region A and the trunk region B from each other. When one of the x-axis reception strength $P_x$, the y-axis reception strength $P_y$, and the z-axis reception strength $P_z$ is in a range of 70 to 120, the controller 110 may determine that the rear-tray region A corresponds to the sum $P_{sum}$ of the 3-axis reception strengths.

That is, in the vehicle key control apparatus 100 or the vehicle 1 including the same in accordance with one embodiment of the present disclosure, the position of the vehicle key 200 may be more precisely determined by individually using the x-axis reception strength $P_x$, the y-axis reception strength $P_y$, and the z-axis reception strength $P_z$, as well as the sum $P_{sum}$ of the 3-axis reception strengths of the 3-axis antenna. Thus, the reliability of determining the position of the vehicle key 200 may be secured even when the number of antennas included in the antenna module 300 is reduced.

The rear-tray region A and the trunk region B described above are merely examples for explaining embodiments of the present disclosure in detail, and two or more regions other than the rear-tray region A and the trunk region B which are difficult to be differentiated from each other using only the sum $P_{sum}$ of the 3-axis reception strengths may be differentiated from each other by individually comparing the x-axis reception strengths $P_x$, the y-axis reception strengths $P_y$, and the z-axis reception strengths $P_z$ thereof.

A vehicle key control method in accordance with an embodiment of the present disclosure will be described below. The above description of the vehicle key control apparatus 100, the vehicle 1 including the same, and the vehicle key 200 may be applied to the vehicle key control method in accordance with an embodiment of the present disclosure. Thus, although not described in the following embodiment, the above description with reference to FIGS. 1 to 12 may also be applied to the vehicle key control method.

Figure 13:
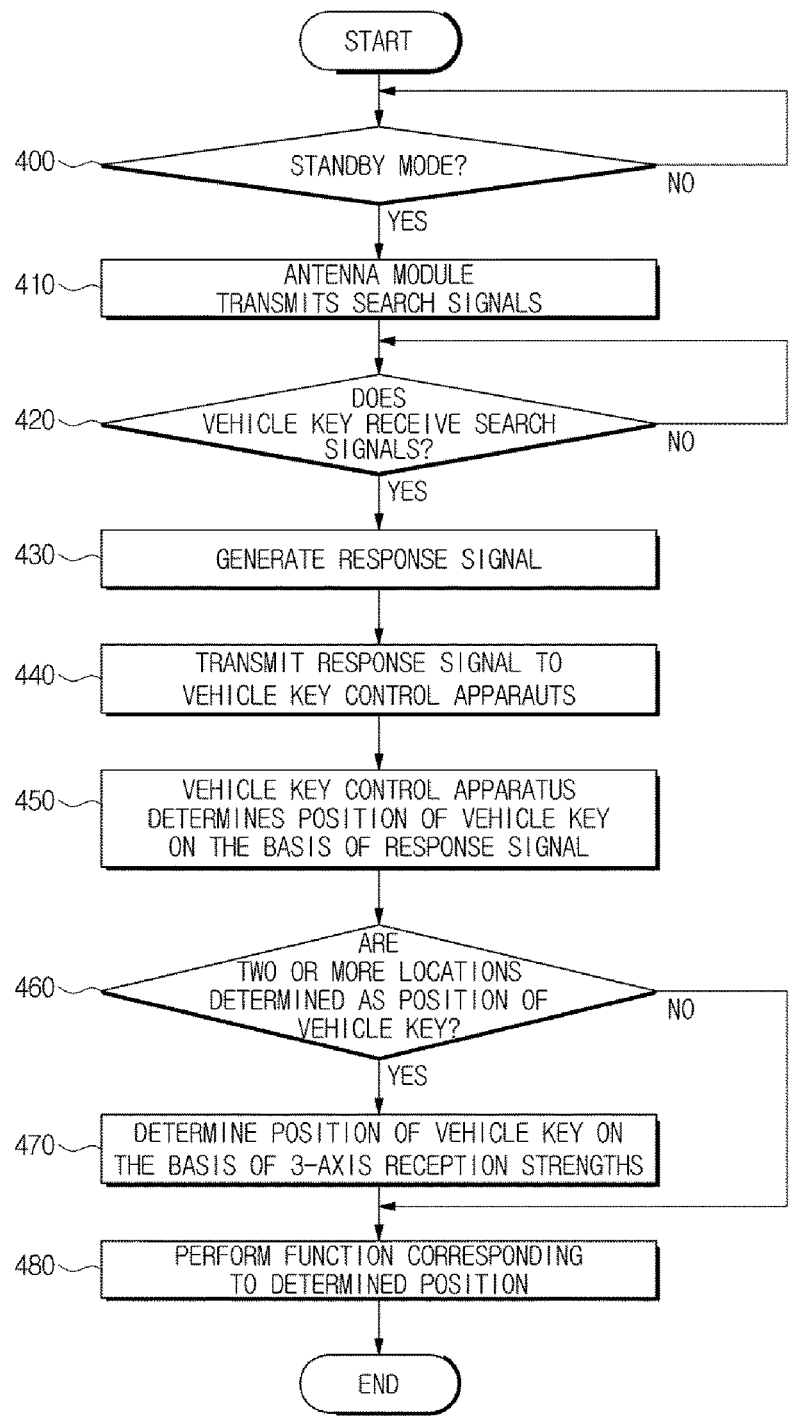
FIG. 13 is a flowchart of a vehicle key control method in accordance with one exemplary embodiment of the present disclosure.

FIG. 13 is a flowchart of a vehicle key control method in accordance with one embodiment of the present disclosure.

First, it is determined whether the vehicle 1 is in the standby mode (400). In the present embodiment, the standby mode is a state in which a user who carries the vehicle key 200 with him/herself is determined to be positioned near the vehicle 1 and is thus waited to get in the vehicle 1. The standby mode may be understood as a state in which all the antennas 310, 320, 330, and 340 included in the antenna module 300 are 'on'.

In order to reduce power consumption before the vehicle 1 is switched to the standby mode, the vehicle 1 may be in the normal mode in which only the antennas 310 and 320 outside the vehicle 1 may be 'on' to transmit search signals. When the antennas 310 and 320 outside the vehicle 1 recognize the vehicle key 200 and authentication between the vehicle key 200 and the vehicle 1 is completed, the vehicle 1 may be switched from the normal mode to the standby mode. Furthermore, when the vehicle 1 is switched to the standby mode, an operation of providing convenience to a user who will get in the vehicle 1, e.g., turning on a light provided at a handle of a door or unfolding a side-view mirror which is folded, may be performed.

However, the switching of the vehicle 1 between the normal mode and the standby mode is merely an example applicable to the vehicle key control method, and the antennas 310, 320, 330, and 340 of the antenna module 300 may continuously transmit search signals regardless of the normal mode and the standby mode.

When the vehicle 1 is switched to the standby mode (400), all the antennas 310, 320, 330, and 340 of the antenna module 300 transmit search signals to detect the position of the vehicle key 200 (410). For example, each of the search signals may be an LF signal or a UHF signal.

When the vehicle key 200 is in an available communication range of the antenna module 300 and thus the communicator 220 of the vehicle key 200 receives the search signals (420), the controller 210 of the vehicle key 200 generates a response signal containing information regarding the reception strengths of the search signals (430). For example, the information regarding the reception strengths may be measured in the form of RSSI, and an x-axis reception strength $P_x$, a y-axis reception strength $P_y$, and a z-axis reception strength $P_z$ which are individual values may be included in the response signal.

The communicator 220 of the vehicle key 200 transmits the response signal to the vehicle key control apparatus 100 (440). For example, the response signal may be an RF signal.

The communicator 120 of the vehicle key control apparatus 100 may receive the response signal, and the controller 110 may determine the position of the vehicle key 200 on the basis of the response signal (450). To this end, a database may be built up beforehand by mapping the reception strengths of the search signals and positions corresponding thereto, and stored in a memory. Here, the sum $P_{sum}$ of the x-axis reception strength $P_x$, the y-axis reception strength $P_y$, and the z-axis reception strength $P_z$ may be used to determine the position of the vehicle key 200.

When two or more positions are determined as the position of the vehicle key 200 (460), the 3-axis reception strengths may be individually compared to determine the position of the vehicle key 200 (470).

Although locations are spatially adjacent to each other, operations or functions corresponding thereto may be different and should be thus differentiated from each other. In a database built up by matching the sum $P_{sum}$ of the x-axis reception strength $P_x$, the y-axis reception strength $P_y$, and the z-axis reception strength $P_z$ and a location corresponding thereto, when two or more positions correspond to the sum $P_{sum}$, it is difficult to differentiate the two or more locations from each other by using only the sum $P_{sum}$. Thus, each of the x-axis reception strength $P_x$, the y-axis reception strength $P_y$, and the z-axis reception strength $P_z$ may be compared with a reference value or a reference range. Locations which are different in at least one among the x-axis reception strength $P_x$, the y-axis reception strength $P_y$, and the z-axis reception strength $P_z$ may be differentiated from each other by individually comparing these values.

As a concrete example, the positions of the rear-tray region A and the trunk region B on an xy plane are similar to each other and are thus difficult to be differentiated from each other using only the sum $P_{sum}$ of the 3-axis reception strengths. However, the positions of the rear-tray region A and the trunk region B on a z-axis are different from each other and may be thus differentiated from each other by individually using the x-axis reception strength $P_x$, the y-axis reception strength $P_y$, and the z-axis reception strength $P_z$.

When the determining of the position of the vehicle key 200 is completed, a function corresponding to the determined position is performed (480). For example, when it is determined that the vehicle key 200 is positioned near the doors 71L, 71R, 72L, and 72R outside the vehicle 1, the controller 110 may control a door open function to be performed so that a user may open the doors 71L, 71R, 72L, and 72R by manipulating the buttons on the doors 71L, 71R, 72L, and 72R.

When it is determined that the vehicle key 200 is positioned near the trunk 92 outside the vehicle 1, the controller 110 may control a trunk open function to be performed so that the user may open the door of the trunk 92 by manipulating the button on the trunk 92.

When it is determined that the vehicle key 200 is positioned inside the vehicle 1, the controller 110 may control a turn-on function to be performed so that the user may turn on the vehicle 1 by manipulating the start button 17.

When it is determined that the vehicle key 200 is positioned inside the trunk 92 within the vehicle 1 and the trunk 92 is closed, a trunk close warning function may be performed so that the user may notice that the vehicle key 200 is in the trunk 92. The trunk close warning function may be performed according to at least one of an audio method and a video method.

A case in which the x-axis reception strength $P_x$, the y-axis reception strength $P_y$, and the z-axis reception strength $P_z$ are individually used when two or more locations correspond to the sum $P_{sum}$ of the 3-axis reception strengths has been descried as an example in the previous embodiment. In accordance with another embodiment of the present disclosure, the x-axis reception strength $P_x$, the y-axis reception strength $P_y$, and the z-axis reception strength $P_z$ may be directly and individually used without comparing the sum $P_{sum}$ of the 3-axis reception strengths with a reference value or a reference range.

In addition, all the operations included in the flowchart of FIG. 13 need not be included in the vehicle key control method, and some operations performed by the vehicle key 200 may not be included in the vehicle key control method.

According to a vehicle key control apparatus, a vehicle including the same, and a vehicle key control method in accordance with the above embodiments, positions which are adjacent to each other and are thus difficult to be differentiated from each other may be differentiated from each other by individually using reception strengths of a 3-axis antenna of the vehicle key.

Thus, even if the number of antennas to be used to recognize the vehicle key is decreased, the reliability of determining the position of the vehicle key may be secured and manufacturing costs may be reduced by decreasing the number of antennas.

Although a vehicle key control apparatus, a vehicle including the same, and a vehicle key control method in accordance with various embodiments of the present disclosure have been described above using limited examples and the drawings, they could have been changed and modified in various ways by those of ordinary skill in the art on the basis of the above description.

For example, appropriate results may be achieved even when the above techniques are performed in an order different from that described above, and/or when the above-described elements such as the system, the structures, the apparatus, the devices, the circuits, etc. are coupled or combined in a manner different from that described above or are replaced or substituted with other elements or equivalents thereof.

Accordingly, it should be construed that other examples, other embodiments, and equivalents to the claims are within the scope of the claims to be described below.

Although a few embodiments of the present disclosure have been shown and described, it would be appreciated by those skilled in the art that changes may be made in these embodiments without departing from the principles and spirit of the disclosure, the scope of which is defined in the claims and their equivalents.

What is claimed is:

1. A vehicle key control apparatus comprising:
a communicator receiving a response signal from a vehicle key receiving a search signal transmitted from a vehicle, wherein the response signal comprises an x-axis reception strength, a y-axis reception strength, and a z-axis reception strength; and
a controller determining a position of the vehicle key on the basis of at least one among the x-axis reception strength, the y-axis reception strength, and the z-axis reception strength,
wherein the controller stores information regarding the position of the vehicle key beforehand by mapping the position to a reference x-axis reception strength, a reference y-axis reception strength, and a reference z-axis reception strength corresponding thereto,
wherein the reference x-axis reception strength, the reference y-axis reception strength, and the reference z-axis reception strength are used to determine the position of the vehicle key by the controller.

2. The vehicle key control apparatus according to claim 1, wherein the controller stores information regarding the position of the vehicle key beforehand by mapping the position to a reference sum of the x-axis reception strength, the y-axis reception strength, and the z-axis reception strength corresponding thereto.

3. The vehicle key control apparatus according to claim 2, wherein the controller determines the position of the vehicle key by comparing the sum of the x-axis reception strength, the y-axis reception strength, and the z-axis reception strength with the stored reference sum.

4. The vehicle key control apparatus according to claim 3, wherein, when two or more positions are determined as the position of the vehicle key, the controller compares at least one among the x-axis reception strength, the y-axis reception strength, and the z-axis reception strength with at least one among the reference x-axis reception strength, the reference y-axis reception strength, and the reference z-axis reception strength corresponding thereto.

5. A vehicle comprising:
an antenna module transmitting a search signal for recognizing a vehicle key; and
a vehicle key control apparatus comprising:
a communicator receiving a response signal from the vehicle key receiving the search signal, wherein the response signal comprises an x-axis reception strength, a y-axis reception strength, and a z-axis reception strength; and
a controller determining a position of the vehicle key on the basis of at least one among the x-axis reception strength, the y-axis reception strength, and the z-axis reception strength,
wherein the controller stores information regarding the position of the vehicle key beforehand by mapping the position to a reference x-axis reception strength, a reference y-axis reception strength, and a reference z-axis reception strength corresponding thereto, wherein the reference x-axis reception strength, the reference y-axis reception strength, and the reference z-axis reception strength are used to determine the position of the vehicle key by the controller.

6. The vehicle according to claim 5, wherein the controller stores information regarding the position of the vehicle key beforehand by mapping the position to a reference sum of the x-axis reception strength, the y-axis reception strength, and the z-axis reception strength corresponding thereto.

7. The vehicle according to claim 6, wherein the controller determines the position of the vehicle key by comparing the sum of the x-axis reception strength, the y-axis reception strength, and the z-axis reception strength with the stored reference sum.

8. The vehicle according to claim 6, wherein, when two or more positions are determined as the position of the vehicle key, the controller compares at least one among the x-axis reception strength, the y-axis reception strength, and the z-axis reception strength with at least one among the reference x-axis reception strength, the reference y-axis reception strength, and the reference z-axis reception strength corresponding thereto.

9. The vehicle according to claim 5, further comprising the vehicle key including a 3-axis antenna for measuring the x-axis reception strength, the y-axis reception strength, and the z-axis reception strength.

10. A vehicle key control method comprising steps of:
receiving a response signal from a vehicle key receiving a search signal transmitted from a vehicle, wherein the response signal comprises an x-axis reception strength, a y-axis reception strength, and a z-axis reception strength;

storing information regarding the position of the vehicle key beforehand by mapping the position to a reference x-axis reception strength, a reference y-axis reception strength, and a reference z-axis reception strength corresponding thereto; and determining a position of the vehicle key on the basis of at least one among the x-axis reception strength, the y-axis reception strength, and the z-axis reception strength, wherein the reference x-axis reception strength, the reference y-axis reception strength, and the reference z-axis reception strength are used to determine the position of the vehicle key by the controller.

11. The vehicle key control method according to claim 10, further comprising a step of storing information regarding the position of the vehicle key beforehand by mapping the position to a reference sum of the x-axis reception strength, the y-axis reception strength, and the z-axis reception strength corresponding thereto.

12. The vehicle key control method according to claim 11, wherein the step of determining the position of the vehicle key comprises determining the position of the vehicle key by comparing the sum of the x-axis reception strength, the y-axis reception strength, and the z-axis reception strength with the stored reference sum.

13. The vehicle key control method according to claim 12, wherein, when two or more positions are determined as the position of the vehicle key, the step of determining the position of the vehicle key further comprises comparing at least one among the x-axis reception strength, the y-axis reception strength, and the z-axis reception strength with at least one among the reference x-axis reception strength, the reference y-axis reception strength, and the reference z-axis reception strength corresponding thereto.

* * * * *